United States Patent
Luo et al.

(10) Patent No.: US 11,574,003 B2
(45) Date of Patent: Feb. 7, 2023

(54) IMAGE SEARCH METHOD, APPARATUS, AND DEVICE

(71) Applicant: ALIBABA GROUP HOLDING LIMITED, Grand Cayman (KY)

(72) Inventors: Weimeng Luo, Hangzhou (CN); Feiyu Gao, Hangzhou (CN); Yongpan Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 117 days.

(21) Appl. No.: 17/159,074

(22) Filed: Jan. 26, 2021

(65) Prior Publication Data

US 2021/0256052 A1 Aug. 19, 2021

(30) Foreign Application Priority Data

Feb. 19, 2020 (CN) .......................... 202010102971.2

(51) Int. Cl.
| | |
|---|---|
| *G06F 16/50* | (2019.01) |
| *G06F 16/53* | (2019.01) |
| *G06F 16/56* | (2019.01) |
| *G06V 10/40* | (2022.01) |
| *G06V 30/10* | (2022.01) |

(52) U.S. Cl.
CPC .............. *G06F 16/53* (2019.01); *G06F 16/56* (2019.01); *G06V 10/40* (2022.01); *G06V 30/10* (2022.01)

(58) Field of Classification Search
CPC ................................. G06F 16/53; G06F 16/56
See application file for complete search history.

(56) References Cited

U.S. PATENT DOCUMENTS

| 9,489,401 | B1 | 11/2016 | Garcia et al. |
| 10,089,576 | B2 | 10/2018 | Gao et al. |
| 10,255,269 | B2 | 4/2019 | Quirk et al. |
| 10,642,891 | B2 | 5/2020 | Choe et al. |
| 10,685,186 | B2 | 6/2020 | Gu et al. |
| 10,860,898 | B2 | 12/2020 | Yang et al. |
| 2011/0043869 | A1* | 2/2011 | Okajo ............... G06F 16/583 707/E17.014 |
| 2014/0250120 | A1 | 9/2014 | Mei et al. |

(Continued)

FOREIGN PATENT DOCUMENTS

| CN | 104899322 A | 9/2015 |
| CN | 105793867 A | 7/2016 |

(Continued)

*Primary Examiner* — Kristopher Andersen

(57) ABSTRACT

Embodiments of the specification provide an image search method, an apparatus, and a device. The method includes: obtaining an input image associated with an image search, wherein the input image includes a plurality of first text blocks; selecting a to-be-processed image from a target database, wherein the to-be-processed image includes a plurality of second text blocks; and generating a first graph structural feature based on the plurality of first text blocks; generating a second graph structural feature based on the plurality of second text blocks; determining that the first graph structural feature and the second graph structural feature satisfy a condition; and in response to determining that the first graph structural feature and the second graph structural feature satisfy the condition, outputting the to-be-processed image as a search result.

17 Claims, 7 Drawing Sheets

(56) References Cited

U.S. PATENT DOCUMENTS

| | | |
|---|---|---|
| 2015/0227505 A1 | 8/2015 | Morimoto |
| 2015/0286896 A1 | 10/2015 | Watanabe et al. |
| 2015/0331929 A1 | 11/2015 | El-Saban et al. |
| 2016/0371379 A1 | 12/2016 | Fang |
| 2017/0124447 A1 | 5/2017 | Chang et al. |
| 2017/0262530 A1 | 9/2017 | Okura |
| 2018/0137551 A1 | 5/2018 | Zheng et al. |
| 2018/0341719 A1 | 11/2018 | Bhatia et al. |
| 2019/0019055 A1* | 1/2019 | Zhou .................... G06N 3/0454 |
| 2019/0258671 A1 | 8/2019 | Bou et al. |
| 2021/0089571 A1* | 3/2021 | Perone .................... G06N 3/08 |
| 2021/0182550 A1* | 6/2021 | Semenov ............. G06V 30/413 |

FOREIGN PATENT DOCUMENTS

| | | |
|---|---|---|
| JP | 2014534540 A | 12/2014 |
| JP | 5857124 B2 | 2/2016 |
| JP | 5936698 B2 | 6/2016 |
| JP | 2017162190 A | 9/2017 |
| RU | 2688271 C2 | 5/2019 |

\* cited by examiner

IMAGE SEARCH METHOD, APPARATUS, AND DEVICE

CROSS-REFERENCE TO RELATED APPLICATION

This application is based on and claims priority to and benefit of Chinese Patent Application No. 202010102971.2, filed with the China National Intellectual Property Administration (CNIPA) on Feb. 19, 2020. The entire content of the above-identified application is incorporated herein by reference.

TECHNICAL FIELD

The specification relates to the field of image processing technologies, and in particular, to an image search method, an apparatus, a device, a system, and a computer-readable storage medium.

BACKGROUND

As image processing technologies are applied to more and more fields of applications, the quantity of images that need to be processed has also been increased. During the image processing, searching for a desired image from a database that stores various images often occurs (e.g., searching for ID card images from a database that stores images including train tickets, ID cards, and orders). The more images are stored in a database, the more difficult it is to search for a given category of images in the database.

Therefore, how to accurately search out desired images of a given category from various images has become a technical problem to be resolved.

SUMMARY

Embodiments of the specification provide an image search method, an apparatus, and a device, for accurately searching out desired images of a given category.

According to a first aspect, an embodiment of the specification provides an image search method. The image search method includes: obtaining an input image, wherein the input image includes a plurality of first text blocks; selecting a to-be-processed image from a target database, wherein the to-be-processed image includes a plurality of second text blocks; generating a first graph structural feature based on the plurality of first text blocks, and generating a second graph structural feature based on the plurality of second text blocks; determining a degree of difference between the first graph structural feature and the second graph structural feature; and outputting the to-be-processed image as a search result.

In an embodiment, an image search method comprises: obtaining an input image associated with an image search, wherein the input image comprises a plurality of first text blocks; selecting a to-be-processed image from a target database, wherein the to-be-processed image comprises a plurality of second text blocks; generating a first graph structural feature based on the plurality of first text blocks; generating a second graph structural feature based on the plurality of second text blocks; determining that the first graph structural feature and the second graph structural feature satisfy a condition; and in response to determining that the first graph structural feature and the second graph structural feature satisfy the condition, outputting the to-be-processed image as a search result of the image search.

In an embodiment, generating a first graph structural feature based on the plurality of first text blocks comprises: generating, based on a plurality of pieces of text content contained in the plurality of first text blocks, a plurality of semantic vectors respectively corresponding to the plurality of first text blocks; generating, based on relative position relationships among the plurality of first text blocks, a plurality of position relationship vectors among the plurality of first text blocks; and generating the first graph structural feature to comprise a plurality of groups of first feature vectors, wherein each of the groups of first feature vectors comprises a semantic vector corresponding to a first text block i, a semantic vector corresponding to a first text block j, and a position relationship vector between the first text block i and the first text block j, wherein the first text block i is one of the plurality of first text blocks, and the first text block j is one of the plurality of first text blocks other than the first text block i.

In an embodiment, generating, based on a plurality of pieces of text content contained in the plurality of first text blocks, a plurality of semantic vectors respectively corresponding to the plurality of first text blocks comprises: encoding one or more words contained in each of the plurality of first text blocks to obtain one or more word vectors respectively corresponding to the one or more words; and calculating an average of the one or more word vectors corresponding to each of the plurality of first text blocks to obtain the semantic vector corresponding to each of the plurality of first text blocks.

In an embodiment, generating, based on relative position relationships among the plurality of first text blocks, a plurality of position relationship vectors among the plurality of first text blocks comprises: for the first text block i and the first text block j, determining a position relationship vector between the first text block i and the first text block j to comprise at least one of: an aspect ratio of the first text block i; a ratio of a width of the first text block j to a height of the first text block i; a ratio of a horizontal distance between the first text block j and the first text block i to the height of the first text block i; or a ratio of a vertical distance between the first text block j and the first text block i to the height of the first text block i.

In an embodiment, generating a second graph structural feature based on the plurality of second text blocks comprises: generating the second graph structural feature based on the plurality of first text blocks and the plurality of second text blocks.

In an embodiment, generating the second graph structural feature based on the plurality of first text blocks and the plurality of second text blocks comprises: generating, based on a plurality of pieces of text content contained in the plurality of second text blocks, a plurality of semantic vectors respectively corresponding to the plurality of second text blocks; generating, based on relative position relationships among the plurality of second text blocks, a plurality of position relationship vectors among the plurality of second text blocks; generating the second graph structural feature to comprise a plurality of groups of second feature vectors and a plurality of groups of third feature vectors, wherein: each of the groups of second feature vectors comprises a semantic vector corresponding to a second text block p, a semantic vector corresponding to a second text block q, and a position relationship vector between the second text block p and the second text block q, the second text block p is one of the plurality of second text blocks, and the second text block q is one of the plurality of second text blocks other than the second text block p, each of the groups of third feature vectors comprises a semantic vector corresponding to a first text block i and the semantic vector corresponding to the second text block p, and the first text block i is one of the plurality of first text blocks.

In an embodiment, the condition comprises that a degree of difference between the first graph structural feature and the second graph structural feature is less than a threshold.

In an embodiment, determining that the first graph structural feature and the second graph structural feature satisfy a condition comprises: inputting the first graph structural feature into a first graph convolutional neural network model, and outputting code vectors respectively corresponding to the plurality of first text blocks through the first graph convolutional neural network model; inputting the second graph structural feature into a second graph convolutional neural network model, and outputting code vectors respectively corresponding to the plurality of second text blocks through the second graph convolutional neural network model; determining the degree of difference between the first graph structural feature and the second graph structural feature based on the code vectors corresponding to the plurality of first text blocks and the code vectors corresponding to the plurality of second text blocks; and in response to determining that the degree of difference is less than the threshold, determining that the first graph structural feature and the second graph structural feature satisfy the condition.

In an embodiment, determining the degree of difference between the first graph structural feature and the second graph structural feature based on the code vectors corresponding to the plurality of first text blocks and the code vectors corresponding to the plurality of second text blocks comprises: determining a first average value of the code vectors corresponding to the plurality of first text blocks and a second average value of the code vectors corresponding to the plurality of second text blocks; and determining, based on the first average value and the second average value, the degree of difference between the first graph structural feature and the second graph structural feature.

In an embodiment, the method further comprises: obtaining a plurality of input images and a plurality of sample images that belong to same categories of the plurality of input images, respectively; marking a plurality of third text blocks contained in each of the plurality of input images; recognizing a plurality of fourth text blocks contained in each of the plurality of sample images; selecting one of the plurality of input images and one of the plurality of sample images as an input pair, generating a third graph structural feature based on the plurality of third text blocks corresponding to the selected input image, and generating a fourth graph structural feature based on the plurality of fourth text blocks corresponding to the selected sample image; and inputting the third graph structural feature to the first graph convolutional neural network model to train the first graph convolutional neural network model and inputting the fourth graph structural feature to the second graph convolutional neural network model to train the second graph convolutional neural network model.

In an embodiment, a loss function of the first graph convolutional neural network model and the second graph convolutional neural network model is $L_{pair}=\max\{0.\gamma-t(1-s(G_{src}, G_{tgt}))\}$, wherein L is a loss function, $\gamma$ is a preset value, $G_{src}$ is an average value of code vectors that are corresponding to the plurality of third text blocks and are output by the first graph convolutional neural network model, $G_{tgt}$ is an average value of code vectors that are corresponding to the plurality of fourth text blocks and are output by the second graph convolutional neural network model, and $s(G_{src}, G_{tgt})$ is a distance between $G_{src}$ and $G_{tgt}$, and wherein if the one of the input images and the one of the sample images correspond to a same category, t=1, and if the one of the input images and the one of the sample images correspond to different categories, t=-1.

According to a second aspect, an embodiment of the specification provides an image search apparatus. The image search apparatus includes: an obtaining module, configured to obtain a input image, wherein the input image includes a plurality of first text blocks, and select a to-be-processed image from a target database, wherein the to-be-processed image includes a plurality of second text blocks; and a search module, configured to generate a first graph structural feature based on the plurality of first text blocks, generate a second graph structural feature based on the plurality of second text blocks, determine that the first graph structural feature and the second graph structural feature satisfy a preset condition, and output the to-be-processed image as a search result.

According to a third aspect, an embodiment of the specification provides an electronic device. The device includes a memory and a processor, wherein the memory stores executable code, and the executable code, when executed by the processor, causes the processor to at least implement the image search method in the first aspect.

An embodiment of the specification provides a non-transitory machine-readable storage medium. The non-transitory machine-readable storage medium stores executable code. The executable code, when executed by a processor of an electronic device, causes the processor to at least implement the method in the first aspect.

In an embodiment, a non-transitory computer-readable storage medium for an image search is configured with instructions executable by one or more processors to cause the one or more processors to perform operations. The operations comprise: obtaining an input image associated with an image search, wherein the input image comprises a plurality of first text blocks; selecting a to-be-processed image from a target database, wherein the to-be-processed image comprises a plurality of second text blocks; generating a first graph structural feature based on the plurality of first text blocks; generating a second graph structural feature based on the plurality of second text blocks; determining that the first graph structural feature and the second graph structural feature satisfy a condition; and in response to determining that the first graph structural feature and the second graph structural feature satisfy the condition, outputting the to-be-processed image as a search result of the image search.

According to a fourth aspect, an embodiment of the specification provides a system for an image search. The system comprises a processor and a non-transitory computer-readable storage medium storing instructions executable by the processor to cause the system to perform operations comprising: obtaining an input image associated with an image search, wherein the input image comprises a plurality of first text blocks; selecting a to-be-processed image from a target database, wherein the to-be-processed image comprises a plurality of second text blocks; generating a first graph structural feature based on the plurality of first text blocks; generating a second graph structural feature based on the plurality of second text blocks; determining that the first graph structural feature and the second graph structural feature satisfy a condition; and in response to determining that the first graph structural feature and the second graph structural feature satisfy the condition, outputting the to-be-processed image as a search result of the image search.

In the embodiments of the specification, because a plurality of images that belong to the same category have similar graph structural features, when searching for an image that is similar to an input image from a target database that stores a plurality of images, first, a plurality of first text blocks contained in the input image are marked. Then, a to-be-processed image is selected from the target database, and a plurality of second text blocks contained in the to-be-processed image are recognized, so as to generate a first graph structural feature corresponding to the input image based on the plurality of first text blocks and generate a second graph structural feature corresponding to the to-be-processed image based on the plurality of second text blocks. By comparing the first graph structural feature with the second graph structural feature, it can be determined whether the first graph structural feature and the second graph structural feature satisfy a preset condition, that is, it is determined whether the graph structural feature of the to-be-processed image is similar to that of the input image in. In this way, all images that share similarities with the input image can be searched out from the target database as a search result of the image search. In this method, based on a concept that graph structural features of images of the same type have a higher degree of similarity, by comparing graph structural features of to-be-processed images with that of an input image, a to-be-processed image that belongs to the same category as the input image can be accurately found.

BRIEF DESCRIPTION OF THE DRAWINGS

To describe the technical solutions in the embodiments of the specification more clearly, the following briefly introduces the accompanying drawings required for describing the embodiments. Apparently, the accompanying drawings in the following description show some embodiments of the specification, and a person of ordinary skill in the art may still derive other drawings according to these accompanying drawings without creative efforts.

DETAILED DESCRIPTION

Figure 1:
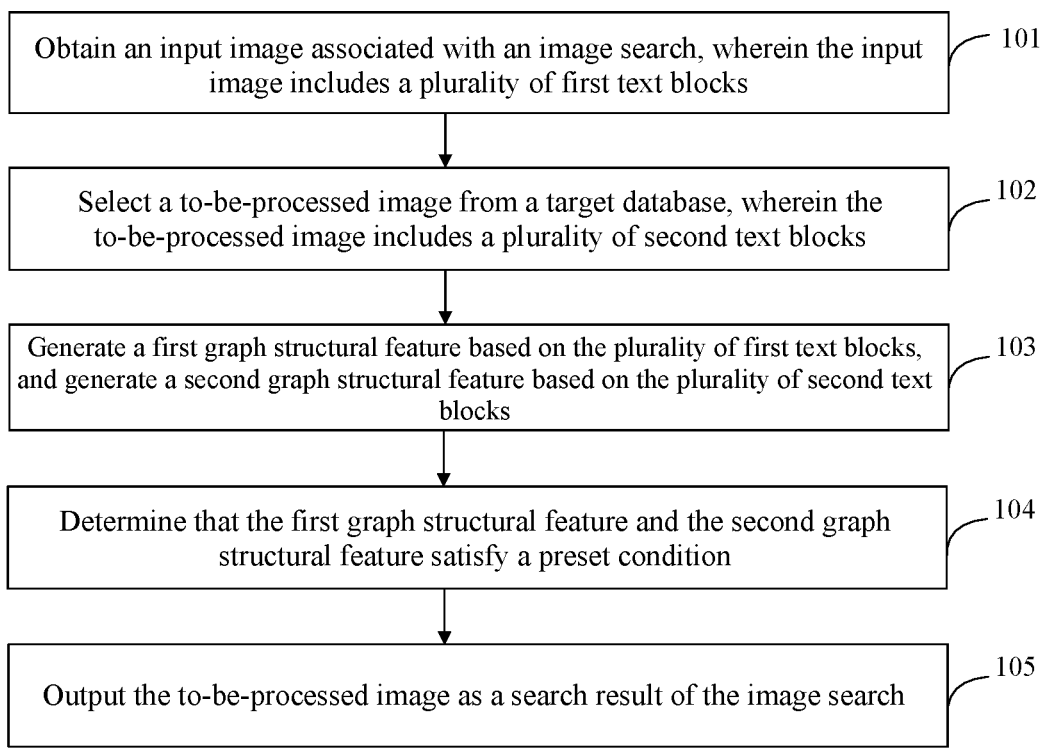
FIG. 1 is a flowchart of an image search method, according to an embodiment of the specification.

To make the objectives, technical solutions, and advantages of the embodiments of the specification clearer, the following clearly and thoroughly describes the technical solutions in the embodiments of the specification with reference to the accompanying drawings in the embodiments of the specification. The described embodiments are merely some embodiments of the specification rather than all of the embodiments. All other embodiments obtained by a person of ordinary skill in the art based on the embodiments of the specification without creative effects shall fall within the protection scope of the specification.

The terms used in the embodiments of the specification are merely for the purpose of illustrating specific embodiments, and do not limit the specification. The terms "a," "said" and "the" of singular forms used in the embodiments and the appended claims of the specification include plural forms, and "a plurality of" is generally greater than or at least equal to two, unless otherwise specified in the context.

Depending on the context, for example, words "if" or "as if" used herein may be explained as "while . . . " or "when . . . " or "in response to determining" or "in response to detection." Similarly, depending on the context, phrases "if determining" or "if detecting (a stated condition or event)" may be explained as "when determining" or "in response to determining" or "when detecting (the stated condition or event)" or "in response to detection (of the stated condition or event)."

In addition, the sequence of steps in the following method embodiments is only an example but not a restrict limitation.

The image search method provided in the embodiments of the specification may be performed by an electronic device, which may be a terminal device such as a smart phone, a tablet computer, a PC, or a notebook computer, or may be a server. The server may be a physical server including an independent host, or a virtual server carried by a host cluster, or a cloud server.

The image search method provided in the embodiments of the specification is suitable for a scenario of searching for a desired image from a database storing a large quantity of images. In practical applications, a desired image may be, for example, an image of a ticket with fixed content, such as a profit tax invoice, an itinerary, a train ticket, or a return request form.

Actual requirements of the image search provided in the embodiments of the specification are illustrated with the following examples.

For example, an objective of the image search is to search out itineraries from reimbursement documents. Taking a transportation expense reimbursement scenario of a company as an example, to add up transportation expenses of the company during a period of time, it is necessary to search out itineraries from a large quantity of reimbursement documents uploaded by employees to an office back-end database for verification.

In another example, an objective of the image search is to search out mortgage loan application forms from audit documents. Taking a risk control department of a bank as an example, to analyze the application status of the current mortgage loan service, it is necessary to search out mortgage loan application forms from a large quantity of audit documents stored in a back-end database of the bank.

If a large quantity of images are stored in a database, how to search out desired images of a given category from the database becomes an urgent problem, which can be resolved by the image search method provided in the embodiments of the specification.

In view of the actual requirements mentioned above, the principle of the image search method provided in the embodiments of the specification is as follows. Because a plurality of images that belong to the same category have similar graph structural features, by comparing graph structural features corresponding to different images, whether the different images belong to the same category can be determined. Here, the similarity in the graph structural features of the plurality of images that belong to the same category may be understood as a similarity in the text contents of the plurality of images and a similarity in position relationships among the pieces of the text contents. Based on the above idea, when searching out an image that is similar to an input image from a target database that stores a plurality of images, by comparing a graph structural feature of to-be-processed images (images stored in the target database) with that of the input image, whether graph structural features of the to-be-processed images are similar to that of the input image can be determined. In this way, to-be-processed images that belong to the same category as the input image can be accurately found out and used as a search result of the image search.

An execution process of the image search method is described below in conjunction with the following embodiments.

FIG. 1 is a flowchart of an image search method according to an embodiment of the specification. As shown in FIG. 1, the method includes the following steps.

101: Obtain an input image associated with an image search (i.e., an input image as a reference image for a search), wherein the input image includes a plurality of first text blocks.

102: Select a to-be-processed image from a target database, wherein the to-be-processed image includes a plurality of second text blocks.

In the embodiments of the specification, for a search task of searching out images of a target category from a database storing a large quantity of images of various categories, it is first necessary to set an input image corresponding to the target category, and then search out images having graph structural features with required similarity with that of the input image. In the specification, a database storing a large quantity of images of various categories is called a target database.

To ensure the accuracy of an image search result, the input image is required to have good image quality, for example, good image sharpness and brightness, and the background is required to be as simple as possible.

In an embodiment, for example, a current image search task is searching out ID card images from a large quantity of images. In this case, a staff can take an ID card image with a good quality as an input image corresponding to the image search task.

In an embodiment, according to a possible image search task in an actual application, the staff may preset an image with a good image quality corresponding to an image search task as an input image. In this way, for a current image search task to be performed, the preset image corresponding to the image search task is directly used as an input image.

After an input image is obtained, to construct a graph structure corresponding to the input image, it is also necessary to mark a plurality of text blocks contained in the input image. Such text blocks are called a plurality of first text blocks.

If the input image is obtained through the foregoing method of "directly using a preset image corresponding to the image search task as an input image," a plurality of first text blocks has been marked in the input image.

The plurality of first text blocks refers to regions in the input image that contain independent fixed text content. In other words, the text content contained in the input image can be divided into fixed text content and non-fixed text content, wherein the fixed content is usually irrelevant to a user and the non-fixed content is usually relevant to a user. Here, the plurality of first text blocks can be obtained by merely marking the fixed text content in the input image. One first text block can be simply understood as a word or a sentence.

Figure 2:
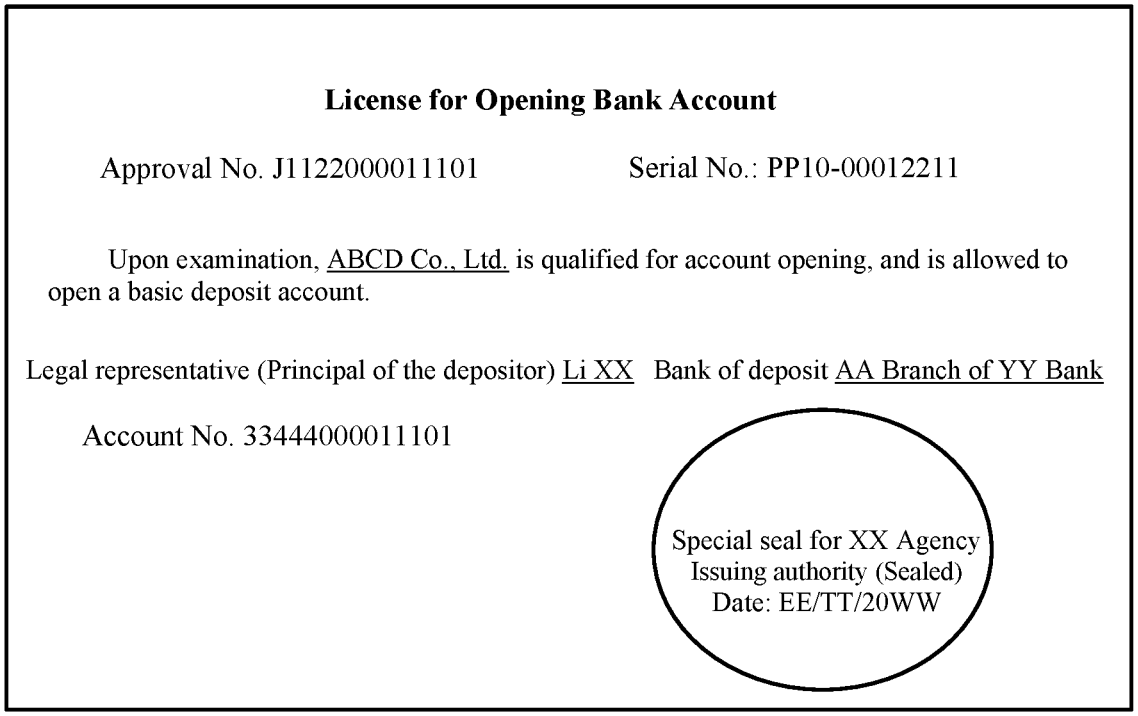
FIG. 2 is a schematic diagram of an input image, according to an embodiment of the specification.

The following example illustrates how to mark the first text blocks in the input image. Assuming that the input image is a permit for opening a bank account shown in FIG. 2. The fixed text content contained in the input image includes "permit for Opening Bank Account," "Approval No.," "Serial No.," "Upon examination," "qualified for opening an account, and being approved," "open a basic deposit account," "Legal representative (Principal of the depositor)," "Bank of deposit," "Account No.," or "Issuing authority (Sealed)." The fixed text content is marked by text boxes to obtain a plurality of first text blocks with different sizes and positions shown in FIG. 3.

Figure 3:
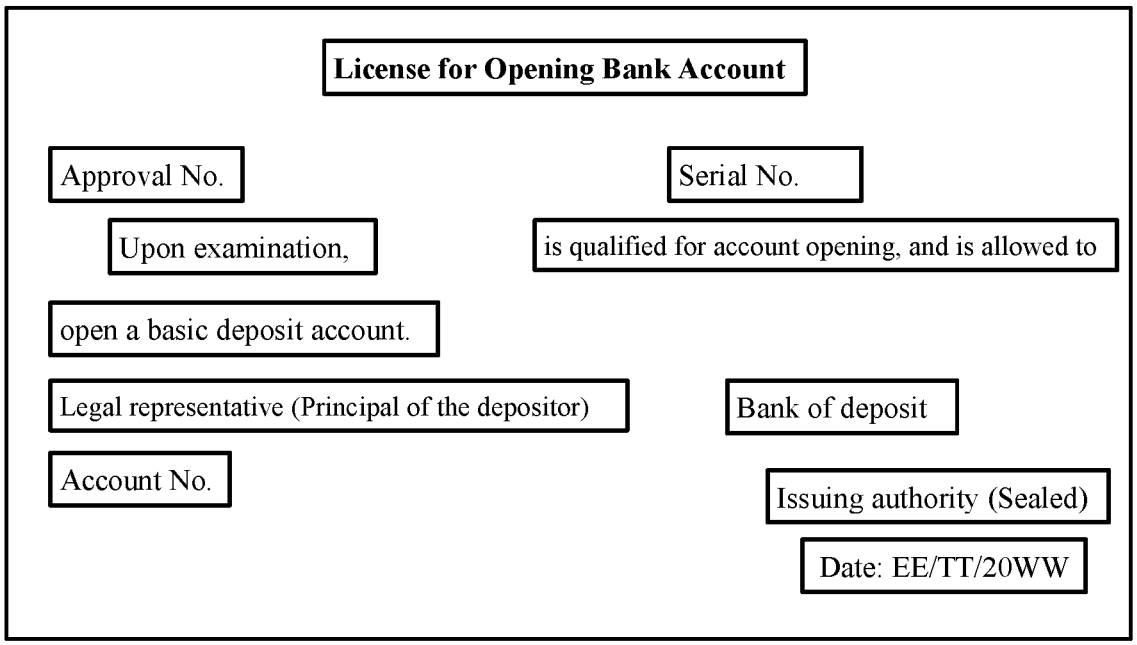
FIG. 3 is a schematic diagram of a graph structure, according to an embodiment of the specification.

As shown in FIG. 3, after the foregoing marking on the input image, the fixed text content contained in the input image can be obtained, and position relationships among the pieces of the fixed text content can also be obtained. The fixed text content and the relative position relationships can be used for constructing a first graph structural feature corresponding to the input image subsequently.

To search out images that belong to the same category as the input image in the target database storing images of various categories, it is necessary to recognize the text blocks contained in a to-be-processed image selected from the target database. Such text blocks are called a plurality of second text blocks. In practical applications, a to-be-processed image may be selected through any image selection methods.

A plurality of second text blocks contained in the to-be-processed image may be obtained through optical character recognition (OCR) software.

In this embodiment, the second text blocks refer to regions in the to-be-processed image that contain independent text content. In other words, the text content contained in the to-be-processed image may also be divided into fixed text content irrelevant to a user and non-fixed text content relevant to a user. Here, the text content in the to-be-processed image is processed to be recognized to determine the text content contained in the to-be-processed image, thereby obtaining a plurality of second text blocks. Therefore, the second text blocks are divided according to layout information of the text content (such as line information, and information of distance between adjacent characters) and semantic relevance in the to-be-processed image.

Figure 4A:
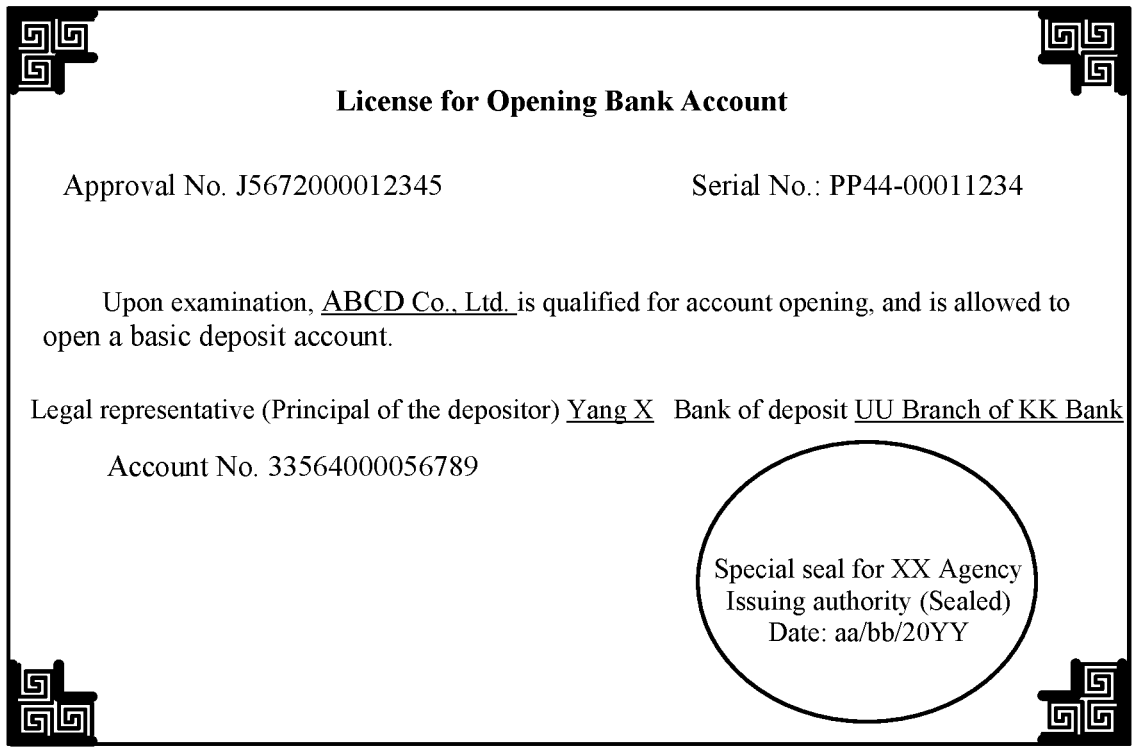
FIG. 4a is a schematic diagram of a to-be-processed image, according to an embodiment of the specification.

For ease of understanding the second text blocks, a to-be-processed image may be a permit for opening a bank account shown in FIG. 4a. An OCR recognition is performed on the permit for opening a bank account shown in FIG. 4a, non-text content such as background graphics, borders, and official seals in the permit for opening a bank account are filtered out, and the remaining text content is divided according to a distribution feature, wherein the text content includes "Permit for Opening Bank Account," "Approval No.," "Serial No.," "Upon examination," "ABCD Co., Ltd.," "Legal representative," "(Principal of the depositor)," "Bank of deposit," "Approval No.," "Issuing authority," and "Special seal for Agency of XX," to obtain a plurality of second text blocks with different sizes and positions shown in FIG. 4b.

Figure 4B:
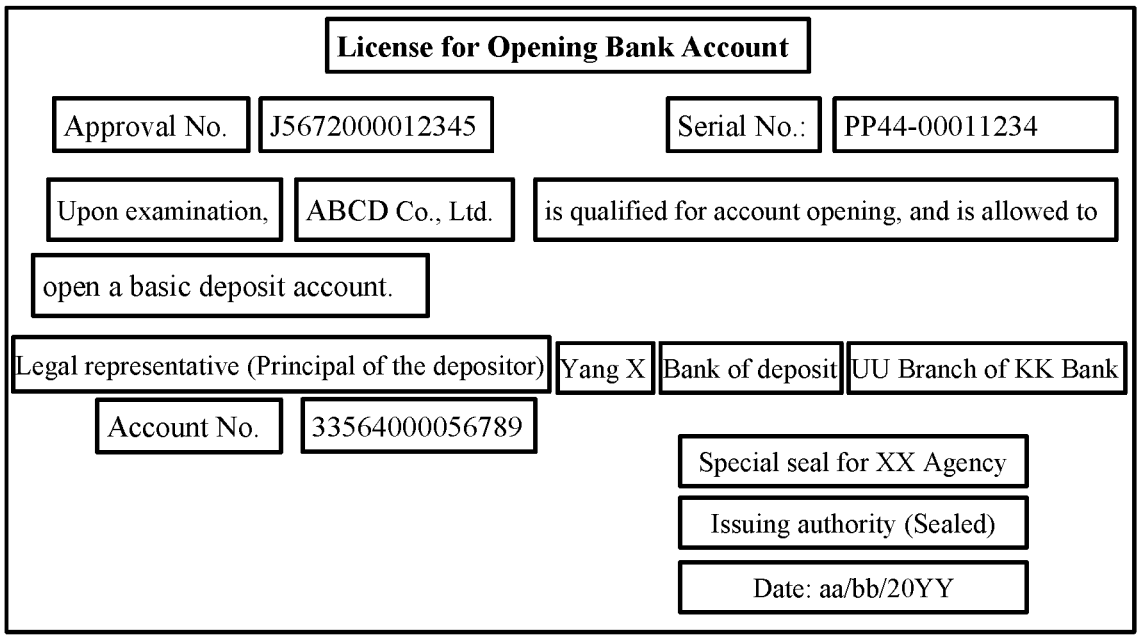
FIG. 4b is a schematic diagram of another graph structure, according to an embodiment of the specification.

As shown in FIG. 4b, after the foregoing recognition processing for the to-be-processed image, text content contained in the to-be-processed image can be obtained, and position relationships among the pieces of the text content can also be obtained. The text content and the relative position relationships can be used for constructing a second graph structural feature corresponding to the to-be-processed image subsequently.

103: Generate a first graph structural feature based on the plurality of first text blocks, and generate a second graph structural feature based on the plurality of second text blocks.

The generating a first graph structural feature based on the plurality of first text blocks can be implemented as follows: generating, according to the text content respectively contained in the plurality of first text blocks, semantic vectors respectively corresponding to the plurality of first text blocks; generating, based on relative position relationships among the plurality of first text blocks, corresponding position relationship vectors among the different first text blocks; and generating the first graph structural feature including a plurality of groups of first feature vectors, wherein each group of first feature vectors includes a semantic vector corresponding to a first text block i, a semantic vector corresponding to a first text block j, and a position relationship vector between the first text block i and the first text block j. The first text block i is any one of the plurality of first text blocks, and the first text block j is any one of the plurality of first text blocks other than the first text block i.

In the foregoing method of obtaining the first graph structural feature, the first graph structural feature includes not only the semantic features respectively corresponding to the plurality of first text blocks, but also the position relationship features among the plurality of first text blocks, which improve the accuracy of an image search result.

In an embodiment, the generating, according to text content respectively contained in the plurality of first text blocks, semantic vectors respectively corresponding to the plurality of first text blocks may be implemented as follows: encoding one or more words contained in each of the plurality of first text blocks to obtain one or more word vectors respectively corresponding to the one or more words; and calculating an average of the one or more word vectors corresponding to each first text block to obtain the semantic vector corresponding to each first text block.

In practical applications, a large quantity of corpus samples can be obtained in advance, and a plurality of words can be obtained by performing word segmentation on the large quantity of corpus samples. Then, the plurality of words are sorted according to the number of occurrences of each word, for example, according to a descending order of the number of occurrences. If there are a total of N words, a word list including N words arranged in sequence can be generated. In addition, word vector conversion may be performed on each word according to an existing word vector conversion algorithm. Assuming that each word is represented by an M-dimensional row vector, an N*M-dimensional word vector matrix is obtained, wherein the word vector in the k-th row of the word vector matrix corresponds to the k-th word in the word list.

Based on this, for the first text block i in the plurality of first text blocks, one or more words contained in the first text block i may be encoded according to the correspondence between the word vector matrix and the word list, so as to convert the words contained in the first text block i into corresponding word vectors, respectively.

Generally, the first text block i usually includes a plurality of words, and each word corresponds to a word vector. Therefore, the first text block i corresponds to a plurality of word vectors. An average value of the plurality of word vectors is calculated, and the calculated average value is used as a semantic vector of the first text block i.

The method of generating the respective semantic vectors corresponding to the plurality of first text blocks is not limited to the embodiments illustrated above, and other methods may also be used to obtain the respective semantic vectors corresponding to the plurality of first text blocks, for example, obtaining the semantic vector through a neural network model.

In an embodiment, the generating, based on relative position relationships among the plurality of first text blocks, corresponding position relationship vectors among the different first text blocks may be implemented as follows. For the first text block i and the first text block j, determining that a corresponding position relationship vector between the first text block i and the first text block j includes at least one of the following ratios: an aspect ratio of the first text block i; a ratio of a width of the first text block j to a height of the first text block i; a ratio of a horizontal distance between the first text block j and the first text block i to the height of the first text block i; or a ratio of a vertical distance between the first text block j and the first text block i to the height of the first text block i.

In practical applications, when the plurality of first text blocks contained in the input image are obtained, position coordinates of each first text block are also marked. The position coordinates of each first text block are represented by coordinates of four vertexes of a corresponding rectangular box. Based on the coordinates of the four vertexes, a length, a width, and a height of each first text block can be obtained.

Based on this, according to the position coordinates corresponding to the first text block i, if it is calculated that the width of the first text block i is Wi and the height is Hi, an aspect ratio of the first text block i is Wi/Hi.

According to the position coordinates corresponding to the first text block j, if it is calculated that the width of the first text block j is Wj, a ratio of the width of the first text block j to the height of the first text block i is Wj/Hi.

According to the respective position coordinates of the first text block i and the first text block j, if it is calculated that a horizontal distance between the two first text blocks is Xji, a ratio of the horizontal distance to the height of the first text block i is Xji/Hi. A calculation method of the horizontal distance Xji is, for example, calculating coordinates of the center point of the rectangular box corresponding to each first text block, and then calculating a difference between abscissas of the coordinates of the center points of the two text blocks to obtain the horizontal distance.

The calculation method of the horizontal distance Xji may be implemented as follows. If the coordinates of the center point of the rectangular box corresponding to the first text block i are (xi1, yi1), and the coordinates of the center point of the rectangular box corresponding to the first text block j are (xj1, yj1), the horizontal distance Xji between the first text block i and the first text block j may be expressed as Xji=|xj1−xi1|.

According to the respective position coordinates of the first text block i and the first text block j, if a vertical distance between the two first text blocks is calculated as Yji, a ratio of the vertical distance to the height of the first text block i is Yji/Hi. A calculation method of the vertical distance Yji is, for example, calculating coordinates of the center point of the rectangular box corresponding to each first text block, and then calculating a difference between ordinates of the coordinates of the center points of the two text blocks to obtain the vertical distance.

The calculation method of the vertical distance Yji may be implemented as follows. If the coordinates of the center point of the rectangular box corresponding to the first text block i are (xi1, yi1), and the coordinates of the center point of the rectangular box corresponding to the first text block j are (xj1, yj1), the vertical distance Yji between the first text block i and the first text block j may be expressed as Yji=|yj1−yi1|.

In an embodiment, the position relationship between the first text block i and the first text block j may be expressed by the foregoing four ratios, to obtain a corresponding position relationship vector between the first text block i and the first text block j, which may be expressed as Rij=[Wi/Hi, Wj/Hi, Xji/Hi, Yji/Hi].

In some embodiments, other combinations of the four ratios may be used to generate the corresponding position relationship vector between the first text block i and the first text block j.

In fact, marking a plurality of first text blocks in the input image and generating semantic vectors of the plurality of first text blocks and corresponding position relationship vectors among the different first text blocks is a process of describing the input image as a graph structure, wherein the graph structure includes nodes and edges. The semantic vectors respectively corresponding to the plurality of first text blocks are nodes of the graph structure, and the position relationship vectors among the different first text blocks are connecting edges in the graph structure.

Figure 5:
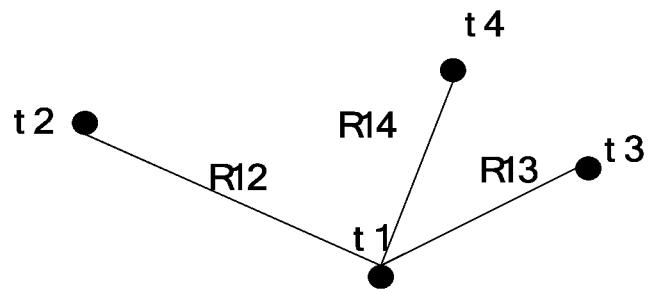
FIG. 5 is a schematic diagram of still another graph structure, according to an embodiment of the specification.

For ease of understanding, a graph structure corresponding to the input image is explained using a graph structure corresponding to the input image shown in FIG. 5. The input image includes four first text blocks, a first text block 1 to a first text block 4. In FIG. 5, semantic vectors corresponding to the four first text blocks are respectively expressed as t1 to t4, wherein ti represents the semantic vector corresponding to the first text block i (that is, the i-th first text block). It can be specified that each first text block has connection relationships with all the other first text blocks. Therefore, for the first text block 1, connecting edges between the first text block 1 (corresponding to t1) and the other three first text blocks are expressed as R12, R13, and R14. FIG. 5 only illustrates a full connection relationship between the first text block 1 and the other first text blocks.

The graph structure corresponding to the input image is represented by the first graph structural feature. For each first text block, a semantic vector corresponding to the first text block, a corresponding position relationship vector between the first text block and another first text block, and a semantic vector corresponding to the another first text block form a group of first feature vectors corresponding to the first text block. The another first text block is any one of the plurality of first text blocks other than the said first text block. Therefore, for the plurality of first text blocks, by generating a plurality of groups of first feature vectors respectively corresponding to the plurality of first text blocks, a first graph structural feature formed by the plurality of groups of first feature vectors can be obtained.

For the first text block i among the plurality of first text blocks, the quantity of the plurality of first text blocks is n, and the first text block j is any one of the n first text blocks other than the first text block i. The semantic vector ti corresponding to the first text block i, the corresponding position relationship vector Rij between the first text block i and the first text block j, and the semantic vector tj corresponding to the first text block j form the group of first feature vectors [ti, Rij, tj] corresponding to the first text block i. Based on this, (n−1) groups of first feature vectors corresponding to the first text block i are generated. For ease of understanding, compositions of the three groups of first feature vectors corresponding to the first text block 1, namely t1, are explained in conjunction with FIG. 5, wherein the three groups of first feature vectors are expressed as [t1, R12, t2], [t1, R13, t3], and [t1, R14, t4] respectively.

The process of generating a plurality of groups of first feature vectors corresponding to another first text block contained in the input image is the same as the process of generating a plurality of groups of first feature vectors corresponding to the first text block 1, which is not described again.

Finally, the plurality of groups of first feature vectors respectively corresponding to the plurality of first text blocks forms the first graph structural feature.

The process of generating a first graph structural feature corresponding to the input image for the plurality of first text blocks contained in the input image is as described above. A process of generating a second graph structural feature corresponding to the to-be-processed image is similar, but there are some differences.

Similar to the process of generating a first graph structural feature described above, in an embodiment, the generating a second graph structural feature based on the plurality of second text blocks may be implemented as follows: generating, based on text content respectively contained in the plurality of second text blocks, semantic vectors respectively corresponding to the plurality of second text blocks; generating, based on relative position relationships among the plurality of second text blocks, corresponding position relationship vectors among the different second text blocks; and generating the second graph structural feature including a plurality of groups of second feature vectors, wherein each group of second feature vectors includes a semantic vector corresponding to a second text block p, a semantic vector corresponding to a second text block q, and a position relationship vector between the second text block p and the second text block q. The second text block p is any one of the plurality of second text blocks, and the second text block q is any one of the plurality of second text blocks other than the second text block p.

The process of generating the group of second feature vectors is similar to the foregoing process of generating the group of first feature vectors, which is not described again.

In the foregoing method of obtaining a second graph structural feature, the second graph structural feature includes not only the semantic features corresponding to the plurality of second text blocks, but also the position relationship features among the plurality of second text blocks, which can reflect layout structure features of the text content of the to-be-processed image and improve the accuracy of an image search result.

Different from the foregoing method of obtaining the second graph structural feature, in another embodiment, the generating a second graph structural feature based on the plurality of second text blocks may be implemented as follows: generating the second graph structural feature based on the plurality of first text blocks and the plurality of second text blocks.

According to the text content respectively contained in the plurality of second text blocks, semantic vectors respectively corresponding to the plurality of second text blocks are generated. According to relative position relationships among the plurality of second text blocks, corresponding position relationship vectors among the different second text blocks are generated, and the second graph structural feature including a plurality of groups of second feature vectors and a plurality of groups of third feature vectors is generated. Each group of second feature vectors includes a semantic vector corresponding to a second text block p, a semantic vector corresponding to a second text block q, and a position relationship vector between the second text block p and the second text block q. Each group of third feature vectors includes a semantic vector corresponding to a first text block i and the semantic vector corresponding to the second text block p. The second text block p is any one of the plurality of second text blocks, the second text block q is any one of the plurality of second text blocks other than the second text block p, and the first text block i is any one of the plurality of first text blocks.

The process of generating the group of second feature vectors is similar to the foregoing process of generating the group of first feature vector, which is not described again.

In the foregoing embodiment, the difference between the second graph structural feature and the first graph structural feature is mainly the group of third feature vectors. Each group of third feature vectors includes a semantic vector of one first text block among the plurality of first text blocks and a semantic vector of one second text block among the plurality of second text blocks. In this way, semantic information of the first text block can be transmitted from the input image to the to-be-processed image. To be consistent with the dimensions of the group of second feature vectors and the group of first feature vectors, the group of third feature vectors may further include a position relationship vector. Taking the first text block i and the second text block p as an example, the position relationship vector represents a position relationship between the first text block i and the second text block p. The position relationship vector may be set to a preset value, for example, a value such as 1 or 0.

For the plurality of second text blocks, by generating a plurality of groups of second feature vectors and a plurality of groups of third feature vectors corresponding to the plurality of second text blocks, the second graph structural feature formed by the plurality of groups of second feature vectors and the plurality of groups of third feature vectors can be obtained.

Figure 6:
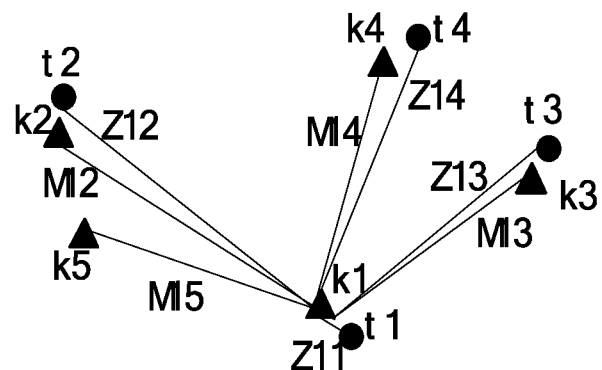
FIG. 6 is a schematic diagram of yet another graph structure, according to an embodiment of the specification.

For ease of understanding, a graph structure corresponding to a to-be-processed image is explained in conjunction with FIG. 5 and FIG. 6. FIG. 6 shows a graph structure corresponding to the to-be-processed image. The to-be-processed image includes five second text blocks, a second text block 1 to a second text block 5. In FIG. 6, semantic vectors corresponding to the five second text blocks are expressed as k1 to k5 respectively, wherein kp represents the semantic vector corresponding to the second text block p (that is, the p-th second text block). It may be specified that each second text block has connection relationships with all the other second text blocks. Therefore, for the second text block 1, connecting edges between the second text block 1 (corresponding to k1) and the other four second text blocks are expressed as M12, M13, M14, and M15, respectively. FIG. 6 only illustrates a full connection relationship between the second text block 1 and the other second text blocks. Based on the illustration in FIG. 6, compositions of the four groups of second feature vectors corresponding to the second text block 1, namely k1, are expressed as [k1, M12, k2], [k1, M13, k3], [k1, M14, k4], and [k1, M15, k5] respectively.

The plurality of groups of third feature vectors corresponding to the plurality of second text blocks are schematically illustrated in conjunction with FIG. 5 and FIG. 6. Referring to the above description, in FIG. 5, the input image includes first text blocks 1 to 4, and semantic information of the four first text blocks are expressed as t1 to t4 respectively.

Based on the illustration in FIG. 5, the semantic information of the four first text blocks is mapped from the input image shown in FIG. 5 to the to-be-processed image shown in FIG. 6. As shown in FIG. 6, the semantic information of the four first text blocks is expressed as t1 to t4. It may be specified that each second text block has connection relationships with the four first text blocks. Therefore, for the second text block 1, connecting edges between the second text block 1 (corresponding to k1) and the four first text blocks (corresponding to t1 to t4) are expressed as Z11, Z12, Z13, and Z14. FIG. 6 only illustrates a full connection relationship between the second text block 1 and the four first text blocks.

Based on the illustration in FIG. 6, compositions of the groups of the four third feature vectors corresponding to the second text block 1, namely k1, are expressed as [k1, Z11, t1], [k1, Z12, t2], [k1, Z13, t3], and [k1, Z14, t4] respectively. In practical applications, Z11, Z12, Z13, and Z14 may be set as preset values, and the preset values are, for example, 0 or 1.

The process of generating a plurality of groups of second feature vectors and a plurality of groups of third feature vectors corresponding to another second text block contained in the to-be-processed image is the same as the process of generating a plurality of groups of second feature vectors and a plurality of groups of third feature vectors corresponding to the second text block 1, which is thus not described again.

Finally, the plurality of groups of second feature vectors corresponding to the plurality of second text blocks forms the second graph structural feature. In another embodiment, the plurality of groups of second feature vectors and the plurality of groups of third feature vectors corresponding to the plurality of second text blocks form the second graph structural feature.

104: Determine that the first graph structural feature and the second graph structural feature satisfy a preset condition.

105: Output the to-be-processed image as a search result of the image search.

In this embodiment, the preset condition includes: a degree of difference between the first graph structural feature corresponding to the input image and the second graph structural feature corresponding to the to-be-processed image is less than a threshold.

The determining that the first graph structural feature and the second graph structural feature satisfy a preset condition may be implemented as follows: inputting the first graph structural feature into a first graph convolutional neural network model, to output code vectors respectively corresponding to the plurality of first text blocks through the first graph convolutional neural network model; inputting the second graph structural feature into a second graph convolutional neural network model, to output code vectors respectively corresponding to the plurality of second text blocks through the second graph convolutional neural network model; determining a degree of difference between the first graph structural feature and the second graph structural feature based on the code vectors corresponding to the plurality of first text blocks and the code vectors corresponding to the plurality of second text blocks; and determining that the first graph structural feature and the second graph structural feature satisfy the preset condition if the degree of difference is less than a set threshold.

In practical applications, both the first graph convolutional neural network model and the second graph convolutional neural network model may be implemented as a multi-layer structure, which has one or more fully connected layers.

Figure 7:
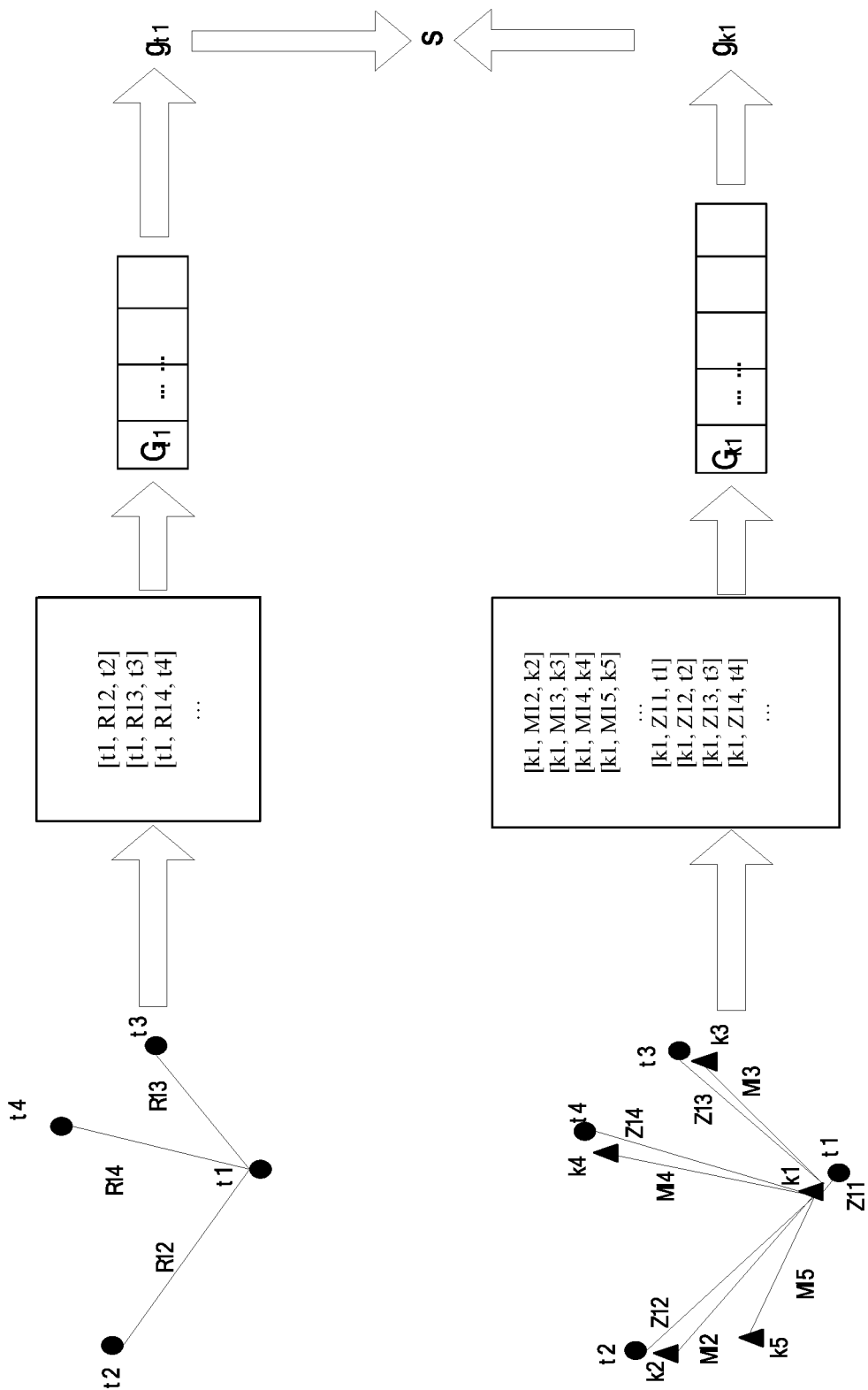
FIG. 7 is a schematic diagram of a principle of an image search process, according to an embodiment of the specification.

A process of obtaining code vectors corresponding to the plurality of first text blocks is schematically illustrated in conjunction with FIG. 5 and FIG. 7. Referring to the above description, in FIG. 5, semantic vectors corresponding to the four first text blocks 1 to 4 are expressed as t1 to t4 respectively. For the first text block 1, connecting edges between the first text block 1 and the other three first text blocks are expressed as R12, R13, and R14. R12, R13, and R14 are position relationship vectors of the first text block 1 with respect to the other three first text blocks.

Based on the illustration in FIG. 5, as shown in FIG. 7, for the first text block 1, the first graph structural feature includes three groups of first feature vectors: [t1, R12, t2], [t1, R13, t3], and [t1, R14, t4], and each group includes three elements or feature vectors, such as t1, R12, and t2. The three groups of first feature vectors are input into the first graph convolutional neural network model, and through the calculation based on the first graph convolutional neural network model, for the three groups of first feature vectors, an code vector corresponding to the first text block 1 can be obtained, which is expressed as Gt1. In FIG. 7, each small square represents an encoding result of a plurality of groups of feature vectors corresponding to one text block, that is, a plurality of squares represent code vectors corresponding to a plurality of text blocks.

The calculation of code vectors corresponding to another first text block contained in the input image is the same as the calculation of code vectors corresponding to the first text block 1, which is thus not described again.

Encoding the vectors respectively corresponding to the plurality of first text blocks can be obtained through the first graph convolutional neural network model, and in an embodiment, a first average value gt1 of the code vectors respectively corresponding to the plurality of first text blocks can be determined. The first average value gt1 is used as an encoding result of the graph structure corresponding to the input image.

Similarly, the second graph structural feature is input into a second graph convolutional neural network model, to output code vectors respectively corresponding to the plurality of second text blocks through the second graph convolutional neural network model.

A process of obtaining code vectors respectively corresponding to the plurality of second text blocks is schematically illustrated in conjunction with FIG. 5, FIG. 6, and FIG. 7. Referring to the above description, in FIG. 6, semantic vectors corresponding to the five second text blocks 1 to 5 are expressed as k1 to k5 respectively. For the second text block 1, connecting edges between the second text block 1 and the other four second text blocks are expressed as M12 to M15.

Based on the illustration in FIG. 5 and FIG. 6, as shown in FIG. 7, for the second text block 1, the second graph structural feature includes the following four groups of second feature vectors and four groups of third feature vectors. The four groups of second feature vectors are expressed as: [k1, M12, k2], [k1, M13, k3], [k1, M14, k4], and [k1, M15, k5], and the four groups of third feature vectors are expressed as: [k1, Z11, t1], [k1, Z12, t1], [k1, Z13, t3], and [k1, Z14, t4]. The four groups of second feature vectors and the four groups of third feature vectors are input into the second graph convolutional neural network model, and through the calculation based on the second graph convolutional neural network model, for the groups of second feature vectors and the groups of third feature vectors, a code vector corresponding to the second text block 1 is obtained and is expressed as $G_{k1}$.

The calculation of code vectors corresponding to another second text block contained in the to-be-processed image is the same as the calculation of the code vector corresponding to the second text block 1, which is thus not described again.

In an embodiment, a second average value $g_{k1}$ of the code vectors respectively corresponding to the plurality of second text blocks can be determined. The second average value $g_{k1}$ is used as an encoding result of the graph structure corresponding to the to-be-processed image.

Finally, according to the first average value gt1 and the second average value $g_{k1}$, a degree of difference between the first graph structural feature and the second graph structural feature is determined.

A smaller difference value between the first average value gt1 and the second average value $g_{k1}$ indicates a smaller difference between the plurality of first text blocks and the plurality of second text blocks in terms of overall layout information and semantic relevance of the text blocks. That is, from the perspective of the graph structure, a lower degree of difference between the first graph structural feature and the second graph structural feature indicates a smaller difference between the input image and the to-be-processed image respectively corresponding to the two graph structures. Therefore, a smaller the difference value between the first average value gt1 and the second average value $g_{k1}$ indicates a smaller difference between the first graph structural feature and the second graph structural feature, that is, the input image and the to-be-processed image are more similar in terms of the graph structural feature. A greater difference value between the first average value gt1 and the second average value $g_{k1}$ indicates a greater difference between the first graph structural feature and the second graph structural feature, that is, the input image and the to-be-processed image are less similar in terms of the graph structural feature.

In an embodiment, the degree of difference between the first average value gt1 and the second average value $g_{k1}$ may be measured by a Euclidean distance. In other words, the Euclidean distance between the first average value gt1 and the second average value $g_{k1}$ may be used to indicate the degree of difference between the input image and the to-be-processed image. Then, a formula for calculating a Euclidean distance s between the first average value gt1 and the second average value $g_{k1}$ is as follows:

$$s(g_{t1}, g_{k1}) = \|g_{t1} - g_{k1}\|^2$$

A greater Euclidean distance s between the first average value gt1 and the second average value $g_{k1}$ indicates a greater difference between the first graph structural feature and the second graph structural feature. A smaller Euclidean distance s between the first average value gt1 and the second average value $g_{k1}$ indicates a smaller difference between the first graph structural feature and the second graph structural feature.

Based on this, if the Euclidean distance between the first average value and the second average value is less than a threshold, it may be considered that the to-be-processed image and the input image are similar in terms of the graph structural feature, that is, it may be determined that the to-be-processed image matches the input image, and the to-be-processed image is output as the search result. Herein, matching refers to matching between the input image and the to-be-processed image that belongs to the same category. Therefore, by traversing a plurality of to-be-processed images with reference to the input image, the to-be-processed image that belongs to the same category as the input image can be searched out.

Figure 8:
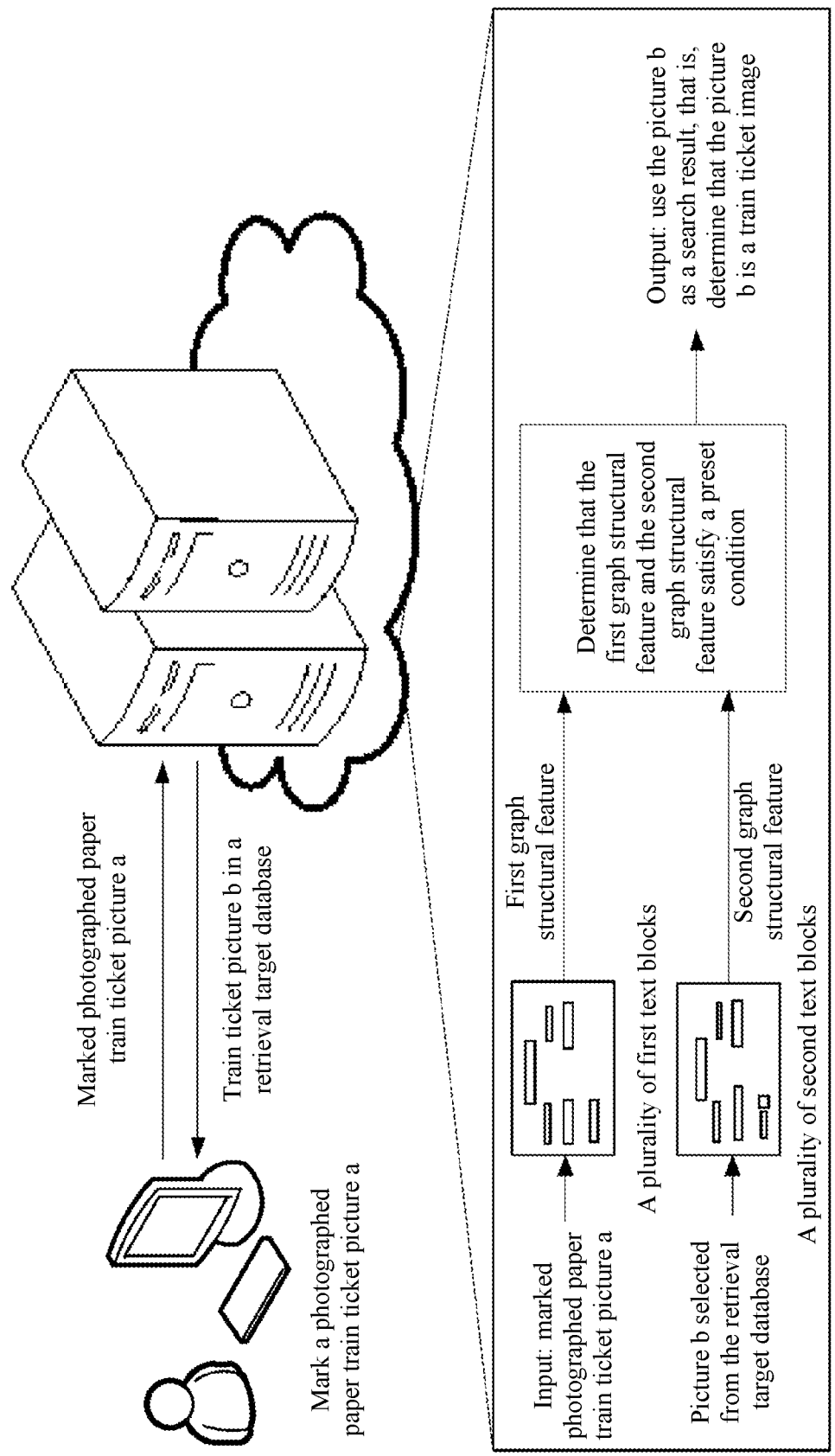
FIG. 8 is a schematic diagram of a principle of another image search process, according to an embodiment of the specification.

To help understand the execution process of the foregoing image search method intuitively, how to screen out the to-be-processed images that match an input image from a target database is illustrated in conjunction with the embodiment shown in FIG. 8.

In the embodiment shown in FIG. 8, a practical scenario of pushing a desired train ticket image to a user is illustrated. In this scenario, a target database is set in a server. The database stores a large quantity of images including a plurality of train ticket images and images of other categories.

The user uploads a photographed paper train ticket picture a through a PC, wherein the picture a may be used as an input image. The picture a is marked to obtain a plurality of first text blocks, and the marked picture a is transmitted to the server for the server to generate a first graph structural feature based on the plurality of first text blocks. At the same time, the server selects a picture b from the target database as a to-be-processed image, recognizes the picture b to obtain a plurality of corresponding second text blocks, and further generates a second graph structural feature based on the plurality of second text blocks. The server calculates a degree of difference between the picture a and the picture b according to the first graph structural feature and the second graph structural feature. If the degree of difference is less than a threshold, it may be determined that the picture b is a train ticket image, and the picture b is output to the PC as a search result. In this way, all pictures matching the picture a can be screened out from the target database as a final search result.

It is assumed that the above user is a financial personnel of a company, and the purpose of searching for train ticket images is to calculate transportation expenses of the company in a period of time. Based on the above search process, all train ticket images in the target database can be searched out, and the user can calculate the transportation expenses (expenses of traveling by trains) of the company within the period of time based on the time and amount of money in the train ticket images that are searched out.

In another embodiment, a practical scenario includes evaluating the risk of a mortgage loan service. In this scenario, a large quantity of pictures are stored in a back-end database of a bank, including pictures of audit documents for various services, for example, application forms, identity certificates, property ownership certificates, and provident fund certificates. In this scenario, the foregoing input image may be a picture c of a mortgage loan application form taken by the bank staff, and the foregoing to-be-processed image may be a picture d selected from the back-end database of the bank. By determining a degree of difference between corresponding graph structural features of the picture c and the picture d, it can be determined whether the picture d is a picture of a mortgage loan application form. If yes, the picture d is output as a search result. Based on the above search process, all the mortgage loan application forms in the back-end database of the bank can be searched out. According to the applicant's income, application amount, and repayment method in each of the mortgage loan application forms that are searched out, processing status of the mortgage loan service (for example, income levels of the applicants, and a total application amount) of the bank in the period of time may be obtained through analysis.

In another embodiment, a scenario may include that a merchant makes inventories of some commodities in a store. In this scenario, upon arrival of a commodity, the merchant may photograph the package of the commodity to obtain a commodity image corresponding to the commodity. When the commodity package is photographed, commodity description information needs to be captured. In practical applications, the commodity description information may include commodity name, type, place of production, production license number, production date, ingredients, two-dimensional code or barcode, and the like. Based on this, in a management platform, correspondences between various commodity images and corresponding commodity sales (including inventories and sales record details) may be stored. It may be understood that each time a commodity is sold, the inventory of the commodity is reduced by one. When the merchant wants to check the inventory of a specific commodity, the commodity may be photographed in real time, and an image containing the commodity description information may be obtained as an input image. All the commodity images stored in the management platform form a target database. An image is selected from the target database as a to-be-processed image, and by recognizing text blocks in the input image and the to-be-processed image, corresponding graph structural features are generated based on the recognized text blocks. In this way, according to a degree of difference between the graph structural features corresponding to the input image and the to-be-processed image, whether the currently selected to-be-processed image matches the input image is determined. If the currently selected to-be-processed image matches the input image, it means that the currently selected to-be-processed image is the commodity image corresponding to the commodity that currently needs to be counted. In this case, sales information including the inventory corresponding to the to-be-processed image in the management platform may be displayed for the merchant to check.

The specific process of the image search method in this embodiment may be understood with reference to the description above.

In summary, in the image search method provided in the embodiments of the specification, because a plurality of images that belong to the same category have similar graph structural features, a search for a to-be-processed image that is similar to an input image is mainly implemented by comparing graph structural features corresponding to the input image and the to-be-processed image. Because text content and position relationships among the text content in the graph structural feature are both taken into consideration, the accuracy of a search result can be effectively guaranteed.

The foregoing introduces the execution process of the image search method. The following briefly describes the training processes of the first graph convolutional neural network model and the second graph convolutional neural network model.

First, a plurality of training samples are obtained, wherein the training samples include a plurality of input images and a plurality of sample images that respectively belong to the same categories as the plurality of input images. Next, text content respectively contained in the plurality of input image is marked. Here, to distinguish from the plurality of first text blocks in the foregoing, the marked result of any input image is referred to as a plurality of third text blocks. It is understandable that the manner of marking the plurality of third text blocks is the same as the manner of marking the plurality of first text blocks in the foregoing. The text content respectively contained in the plurality of sample images is recognized. Here, to distinguish from the plurality of second text blocks in the foregoing, the marked result of any sample image is referred to as a plurality of fourth text blocks. It is understandable that the manner of marking the plurality of fourth text blocks is the same as the manner of marking the plurality of second text blocks in the foregoing. After that, the plurality of input images and the plurality of sample images are paired. Any marked input image X and any marked sample image Y are used as an input pair. A third graph structural feature is generated according to the plurality of third text blocks contained in the input image X, and a fourth graph structural feature is generated according to the plurality of fourth text blocks contained in the sample image Y. Here, the method of obtaining the third graph structural feature is the same as the method of obtaining the first graph structural feature, and the method of obtaining the fourth graph structural feature is the same as the method of obtaining the second graph structural feature, which are not described again. Thus, the third graph structural feature is input to the first graph convolutional neural network model, and the fourth graph structural feature is input to the second graph convolutional neural network model, to train the first graph convolutional neural network model and the second graph convolutional neural network model, respectively.

In the process of training the first graph convolutional neural network model and the second graph convolutional neural network model, the processing for the third text blocks is the same as the processing for the first text block i in the foregoing, and the processing for fourth text blocks is the same as the processing for the second text block p in the foregoing, which are not described again.

For any input image X and any sample image Y that are input as a pair, a final output is a prediction result whether any sample image Y matches any input image X. This prediction needs to be compared with a label result preset for the input pair, to determine a loss function of the model.

A loss function of the first graph convolutional neural network model and the second graph convolutional neural network model is as follows: wherein $L_{pair}$ is a loss function, $\gamma$ is a preset value, $G_{src}$ is an average value of code vectors corresponding to the plurality of third text blocks and is output by the first graph convolutional neural network model, $G_{tgt}$ is an average value of code vectors corresponding to the plurality of fourth text blocks and is output by the second graph convolutional neural network model, and $s(G_{src}, G_{tgt})$ is a distance between $G_{src}$ and $G_{tgt}$. If any one of the input images and any one of the sample images correspond to the same category, a value of t is set to 1. If any one of the input images and any one of the sample images correspond to different categories, a value of t is set to −1. Based on the loss function, parameters of the first graph convolutional neural network model and the second graph convolutional neural network model are adjusted by the feedback until the two models converge.

In summary, in the model training method provided in this embodiment of the specification, by using training samples (input images and sample images) that belong to a plurality of categories, the model is provided with the capability of learning the correspondences among different categories of input images and the corresponding sample images in terms of graph structural features. In other words, through this model training method, a universal model that can implement image matching processing can be finally obtained. The image matching refers to matching between an input image and a corresponding sample image of the same category. Based on this, even if an input image belongs to a category that has not been used in the model training stage, this model can still be used for searching an image matching the input image in a searching task of a practical application. In this case, only one input image of this category needs to be defined.

An image search apparatus in one or more embodiments of the specification will be described below in detail. A person skilled in the art can understand that all such image search apparatuses may be configured by using commercially available hardware components through the steps taught in this solution.

Figure 9:
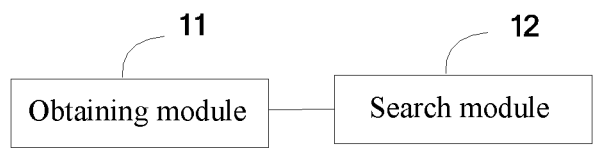
FIG. 9 is a schematic structural diagram of an image search apparatus, according to an embodiment of the specification.

FIG. 9 is a schematic structural diagram of an image search apparatus, according to an embodiment of the specification. As shown in FIG. 9, the image search apparatus includes an obtaining module 11 and a search module 12.

The obtaining module 11 is configured to obtain an input image associated with an image search, wherein the input image includes a plurality of first text blocks, and select a to-be-processed image from a target database, wherein the to-be-processed image includes a plurality of second text blocks.

The search module 12 is configured to generate a first graph structural feature based on the plurality of first text blocks, generate a second graph structural feature based on the plurality of second text blocks, determine that the first graph structural feature and the second graph structural feature satisfy a preset condition, and output the to-be-processed image as a search result.

In an embodiment, in the process of generating a first graph structural feature based on the plurality of first text blocks, the search module 12 is configured to: generate, according to text content respectively contained in the plurality of first text blocks, semantic vectors respectively corresponding to the plurality of first text blocks; generate, according to relative positional relationships among the plurality of first text blocks, corresponding position relationship vectors among the different first text blocks; and generate the first graph structural feature including a plurality of groups of first feature vectors, wherein each group of first feature vector includes a semantic vector corresponding to a first text block i, a semantic vector corresponding to a first text block j, and a positional relationship vector between the first text block i and the first text block j, wherein the first text block i is any one of the plurality of first text blocks, and the first text block j is any one of the plurality of first text blocks other than the first text block i.

In an embodiment, during the generating, according to text content respectively contained in the plurality of first text blocks, semantic vectors respectively corresponding to the plurality of first text blocks, the search module 12 is configured to: encode words respectively contained in the plurality of first text blocks to obtain corresponding word vectors; and calculate an average of the plurality of word vectors corresponding to each first text block to obtain the semantic vector corresponding to each first text block.

In an embodiment, a corresponding position relationship vector between the first text block i and the first text block j including at least one of the following ratios: an aspect ratio of the first text block i; a ratio of a width of the first text block j to a height of the first text block i; a ratio of a horizontal distance between the first text block j and the first text block i to the height of the first text block i; and a ratio of a vertical distance between the first text block j and the first text block i to the height of the first text block i.

In an embodiment, in the process of generating a second graph structural feature based on the plurality of second text blocks, the search module 12 is configured to generate a second graph structural feature based on the plurality of first text blocks and the plurality of second text blocks.

In an embodiment, in the process of generating a second graph structural feature based on the plurality of first text blocks and the plurality of second text blocks, the search module 12 is configured to: generate, according to text content respectively contained in the plurality of second text blocks, semantic vectors respectively corresponding to the plurality of second text blocks; generate, according to relative position relationships among the plurality of second text blocks, corresponding position relationship vectors among the different second text blocks; generate the second graph structural feature including a plurality of groups of second feature vectors and a plurality of groups of third feature vectors, wherein each group of second feature vectors includes a semantic vector corresponding to a second text block p, a semantic vector corresponding to a second text block q, and a position relationship vector between the second text block p and the second text block q, wherein the second text block p is any one of the plurality of second text blocks, and the second text block q is any one of the plurality of second text blocks other than the second text block p; and each group of third feature vectors includes a semantic vector corresponding to a first text block i and the semantic vector corresponding to the second text block p, and the first text block i is any one of the plurality of first text blocks.

In an embodiment, the preset condition includes that a degree of difference between the first graph structural feature and the second graph structural feature is less than a set threshold.

In an embodiment, during the determining that the first graph structural feature and the second graph structural feature satisfy a preset condition, the search module 12 is configured to: input the first graph structural feature into a first graph convolutional neural network model, to output code vectors respectively corresponding to the plurality of first text blocks through the first graph convolutional neural network model; input the second graph structural feature into a second graph convolutional neural network model, to output code vectors respectively corresponding to the plurality of second text blocks through the second graph convolutional neural network model; determine a degree of difference between the first graph structural feature and the second graph structural feature based on the code vectors respectively corresponding to the plurality of first text blocks and the code vectors respectively corresponding to the plurality of second text blocks; and determine that the first graph structural feature and the second graph structural feature satisfy the preset condition if the degree of difference is less than the set threshold.

In an embodiment, during the determining a degree of difference between the first graph structural feature and the second graph structural feature based on the code vectors respectively corresponding to the plurality of first text blocks and the code vectors respectively corresponding to the plurality of second text blocks, the search module 12 is configured to: determine a first average value of the code vectors respectively corresponding to the plurality of first text blocks, and determine a second average value of the code vectors respectively corresponding to the plurality of second text blocks; and determine, according to the first average value and the second average value, the degree of difference between the first graph structural feature and the second graph structural feature.

In an embodiment, the apparatus further includes a training module. The training module is configured to obtain a plurality of input images and a plurality of sample images that respectively belongs to the same categories as the plurality of input images, mark a plurality of third text blocks contained in each of the plurality of input images, and recognize a plurality of fourth text blocks contained in each of the plurality of sample images. With any one of the input images and any one of the sample images as an input pair, generating a third graph structural feature based on the plurality of third text blocks, generating a fourth graph structural feature based on the plurality of third text blocks and the plurality of fourth text blocks, and inputting the third graph structural feature and the fourth graph structural feature to the first graph convolutional neural network model and the second graph convolutional neural network model respectively, to train the first graph convolutional neural network model and the second graph convolutional neural network model respectively.

A loss function of the first graph convolutional neural network model and the second graph convolutional neural network model is as follows:

$$L_{pair}=\max\{0,\gamma-t(1-s(G_{src},G_{tgt}))\}$$

wherein $L_{pair}$ is a loss function, $\gamma$ is a preset value, $G_{src}$ is an average value of code vectors corresponding to the plurality of third text blocks and is output by the first graph convolutional neural network model, $G_{tgt}$ is an average value of code vectors corresponding to the plurality of fourth text blocks and is output by the second graph convolutional neural network model, and $s(G_{src}, G_{tgt})$ is a distance between $G_{src}$ and $G_{tgt}$. If the any one of the input images and the any one of the sample images correspond to the same category, $t=1$, and if the any one of the input images and the any one of the sample images correspond to different categories, $t=-1$.

The image search apparatus shown in FIG. 9 can perform the methods provided in the foregoing embodiments. For parts that are not described in detail in this embodiment, reference may be made to the relevant descriptions of the foregoing embodiments, which will not be repeated here.

Figure 10:
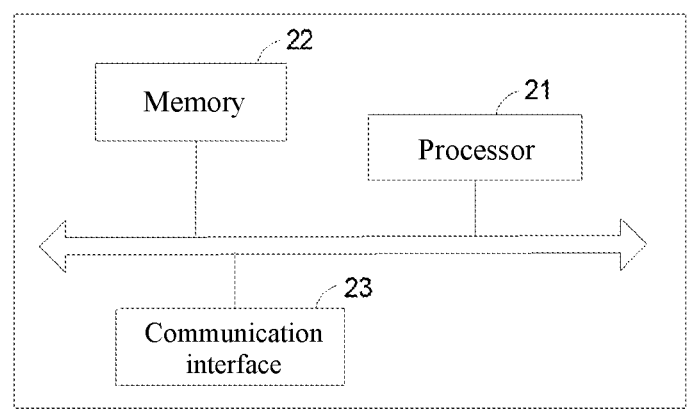
FIG. 10 is a schematic structural diagram of an electronic device corresponding to the image search apparatus shown in FIG. 9, according to an embodiment of the specification.

In an embodiment, the structure of the image search apparatus shown in FIG. 9 may be implemented as an electronic device. As shown in FIG. 10, the electronic device may include a processor 21 and a memory 22. The memory 22 stores computer executable code, and the computer executable code, when executed by the processor 21, at least causes the processor 21 to implement the image search method provided in the foregoing embodiment.

The structure of the electronic device may further include a communication interface 23, configured to communicate with other devices or communication networks.

In addition, an embodiment of the specification provides a non-transitory machine-readable storage medium, and the non-transitory machine-readable storage medium stores computer executable code. The computer executable code, when executed by a processor, causes the processor to implement the image search method provided in the foregoing embodiments.

The apparatus embodiment described above is merely some examples, and the modules described as separate components may or may not be physically separated. Some or all of the modules may be selected according to actual needs to achieve the objectives of the solutions of the embodiments. A person of ordinary skill in the art may understand and implement the embodiments of the specification without creative efforts.

Through the description of the foregoing embodiments, a person skilled in the art may clearly understand that the embodiments may be implemented by software in addition to a necessary universal hardware platform, and may certainly be implemented by a combination of hardware and software. Based on this understanding, the foregoing technical solutions essentially or the part of the solutions that contributes to existing technologies can be embodied in the form of a computer product. The specification may use a form of a computer program product that is implemented on one or more computer-readable storage media (including but not limited to a disk memory, a CD-ROM, an optical memory, and the like) that include computer-usable program code.

Finally, it should be noted that the foregoing embodiments merely describe but do not limit the technical solutions of the specification. Although the specification is described in detail with reference to the foregoing embodiments, a persons of ordinary skill in the art should understand that modifications may still be made to the technical solutions described in the foregoing embodiments or equivalent replacements may still be made to some technical features thereof, without departing from the spirit and scope of the technical solutions of the embodiments of the specification.

What is claimed is:

1. An image search method, comprising:
    obtaining an input image associated with an image search, wherein the input image comprises a plurality of first text blocks;
    selecting a to-be-processed image from a target database, wherein the to-be-processed image comprises a plurality of second text blocks;
    generating a first graph structural feature based on the plurality of first text blocks;
    generating a second graph structural feature based on the plurality of second text blocks;
    determining that the first graph structural feature and the second graph structural feature satisfy a condition, wherein the determining comprises:
        inputting the first graph structural feature into a first graph convolutional neural network model, and outputting code vectors respectively corresponding to the plurality of first text blocks through the first graph convolutional neural network model;
        inputting the second graph structural feature into a second graph convolutional neural network model, and outputting code vectors respectively corresponding to the plurality of second text blocks through the second graph convolutional neural network model;
        determining a degree of difference between the first graph structural feature and the second graph structural feature based on the code vectors corresponding to the plurality of first text blocks and the code vectors corresponding to the plurality of second text blocks; and
        in response to determining that the degree of difference is less than a threshold, determining that the first graph structural feature and the second graph structural feature satisfy the condition; and
    in response to determining that the first graph structural feature and the second graph structural feature satisfy the condition, outputting the to-be-processed image as a search result of the image search.

2. The method according to claim 1, wherein the generating a first graph structural feature based on the plurality of first text blocks comprises:
    generating, based on a plurality of pieces of text content contained in the plurality of first text blocks, a plurality of semantic vectors respectively corresponding to the plurality of first text blocks;
    generating, based on relative position relationships among the plurality of first text blocks, a plurality of position relationship vectors among the plurality of first text blocks; and
    generating the first graph structural feature to comprise a plurality of groups of first feature vectors, wherein each of the groups of first feature vectors comprises a semantic vector corresponding to a first text block i, a semantic vector corresponding to a first text block j, and a position relationship vector between the first text block i and the first text block j, wherein the first text block i is one of the plurality of first text blocks, and the first text block j is one of the plurality of first text blocks other than the first text block i.

3. The method according to claim 2, wherein the generating, based on a plurality of pieces of text content contained in the plurality of first text blocks, a plurality of semantic vectors respectively corresponding to the plurality of first text blocks comprises:
    encoding one or more words contained in each of the plurality of first text blocks to obtain one or more word vectors respectively corresponding to the one or more words; and
    calculating an average of the one or more word vectors corresponding to each of the plurality of first text blocks to obtain the semantic vector corresponding to each of the plurality of first text blocks.

4. The method according to claim 2, wherein the generating, based on relative position relationships among the plurality of first text blocks, a plurality of position relationship vectors among the plurality of first text blocks comprises:
    for the first text block i and the first text block j, determining a position relationship vector between the first text block i and the first text block j to comprise at least one of:
    an aspect ratio of the first text block i;
    a ratio of a width of the first text block j to a height of the first text block i;
    a ratio of a horizontal distance between the first text block j and the first text block i to the height of the first text block i; or
    a ratio of a vertical distance between the first text block j and the first text block i to the height of the first text block i.

5. The method according to claim 1, wherein the generating a second graph structural feature based on the plurality of second text blocks comprises:
    generating the second graph structural feature based on the plurality of first text blocks and the plurality of second text blocks.

6. The method according to claim 1, wherein the determining the degree of difference between the first graph structural feature and the second graph structural feature based on the code vectors corresponding to the plurality of first text blocks and the code vectors corresponding to the plurality of second text blocks comprises:
   determining a first average value of the code vectors corresponding to the plurality of first text blocks and a second average value of the code vectors corresponding to the plurality of second text blocks; and
   determining, based on the first average value and the second average value, the degree of difference between the first graph structural feature and the second graph structural feature.

7. The method according to claim 1, further comprising:
   obtaining a plurality of input images and a plurality of sample images that belong to same categories of the plurality of input images, respectively;
   marking a plurality of third text blocks contained in each of the plurality of input images;
   recognizing a plurality of fourth text blocks contained in each of the plurality of sample images;
   selecting one of the plurality of input images and one of the plurality of sample images as an input pair, generating a third graph structural feature based on the plurality of third text blocks corresponding to the selected input image, and generating a fourth graph structural feature based on the plurality of fourth text blocks corresponding to the selected sample image; and
   inputting the third graph structural feature to the first graph convolutional neural network model to train the first graph convolutional neural network model and inputting the fourth graph structural feature to the second graph convolutional neural network model to train the second graph convolutional neural network model.

8. A system for an image search, comprising a processor and a non-transitory computer-readable storage medium storing instructions executable by the processor to cause the system to perform operations comprising:
   obtaining an input image associated with an image search, wherein the input image comprises a plurality of first text blocks;
   selecting a to-be-processed image from a target database, wherein the to-be-processed image comprises a plurality of second text blocks;
   generating a first graph structural feature based on the plurality of first text blocks;
   generating a second graph structural feature based on the plurality of second text blocks;
   determining that the first graph structural feature and the second graph structural feature satisfy a condition, wherein the determining comprises:
      inputting the first graph structural feature into a first graph convolutional neural network model, and outputting code vectors respectively corresponding to the plurality of first text blocks through the first graph convolutional neural network model;
      inputting the second graph structural feature into a second graph convolutional neural network model, and outputting code vectors respectively corresponding to the plurality of second text blocks through the second graph convolutional neural network model:
      determining a degree of difference between the first graph structural feature and the second graph structural feature based on the code vectors corresponding to the plurality of first text blocks and the code vectors corresponding to the plurality of second text blocks; and
      in response to determining that the degree of difference is less than a threshold, determining that the first graph structural feature and the second graph structural feature satisfy the condition; and
   in response to determining that the first graph structural feature and the second graph structural feature satisfy the condition, outputting the to-be-processed image as a search result of the image search.

9. The system according to claim 8, wherein the generating a first graph structural feature based on the plurality of first text blocks comprises:
   generating, based on a plurality of pieces of text content contained in the plurality of first text blocks, a plurality of semantic vectors respectively corresponding to the plurality of first text blocks;
   generating, based on relative position relationships among the plurality of first text blocks, a plurality of position relationship vectors among the plurality of first text blocks; and
   generating the first graph structural feature to comprise a plurality of groups of first feature vectors, wherein each of the groups of first feature vectors comprises a semantic vector corresponding to a first text block i, a semantic vector corresponding to a first text block j, and a position relationship vector between the first text block i and the first text block j, wherein the first text block i is one of the plurality of first text blocks, and the first text block j is one of the plurality of first text blocks other than the first text block i.

10. The system of claim 9, wherein the generating, based on a plurality of pieces of text content contained in the plurality of first text blocks, a plurality of semantic vectors respectively corresponding to the plurality of first text blocks comprises:
   encoding one or more words contained in each of the plurality of first text blocks to obtain one or more word vectors respectively corresponding to the one or more words; and
   calculating an average of the one or more word vectors corresponding to each of the plurality of first text blocks to obtain the semantic vector corresponding to each of the plurality of first text blocks.

11. The system of claim 9, wherein the generating, based on relative position relationships among the plurality of first text blocks, a plurality of position relationship vectors among the plurality of first text blocks comprises:
   for the first text block i and the first text block j, determining a position relationship vector between the first text block i and the first text block j to comprise at least one of:
   an aspect ratio of the first text block i;
   a ratio of a width of the first text block j to a height of the first text block i;
   a ratio of a horizontal distance between the first text block j and the first text block i to the height of the first text block i; or
   a ratio of a vertical distance between the first text block j and the first text block i to the height of the first text block i.

12. The system of claim 8, wherein the generating a second graph structural feature based on the plurality of second text blocks comprises:

generating the second graph structural feature based on the plurality of first text blocks and the plurality of second text blocks.

13. The system of claim 8, wherein the determining the degree of difference between the first graph structural feature and the second graph structural feature based on the code vectors corresponding to the plurality of first text blocks and the code vectors corresponding to the plurality of second text blocks comprises:
    determining a first average value of the code vectors corresponding to the plurality of first text blocks and a second average value of the code vectors corresponding to the plurality of second text blocks; and
    determining, based on the first average value and the second average value, the degree of difference between the first graph structural feature and the second graph structural feature.

14. The system of claim 8, wherein the operations further comprising:
    obtaining a plurality of input images and a plurality of sample images that belong to same categories of the plurality of input images, respectively;
    marking a plurality of third text blocks contained in each of the plurality of input images;
    recognizing a plurality of fourth text blocks contained in each of the plurality of sample images;
    selecting one of the plurality of input images and one of the plurality of sample images as an input pair, generating a third graph structural feature based on the plurality of third text blocks corresponding to the selected input image, and generating a fourth graph structural feature based on the plurality of fourth text blocks corresponding to the selected sample image; and
    inputting the third graph structural feature to the first graph convolutional neural network model to train the first graph convolutional neural network model and inputting the fourth graph structural feature to the second graph convolutional neural network model to train the second graph convolutional neural network model.

15. A non-transitory computer-readable storage medium for an image search, configured with instructions executable by one or more processors to cause the one or more processors to perform operations comprising:
    obtaining an input image associated with an image search, wherein the input image comprises a plurality of first text blocks;
    selecting a to-be-processed image from a target database, wherein the to-be-processed image comprises a plurality of second text blocks;
    generating a first graph structural feature based on the plurality of first text blocks;
    generating a second graph structural feature based on the plurality of second text blocks;
    determining that the first graph structural feature and the second graph structural feature satisfy a condition, wherein the determining comprises:
        inputting the first graph structural feature into a first graph convolutional neural network model, and outputting code vectors respectively corresponding to the plurality of first text blocks through the first graph convolutional neural network model;
        inputting the second graph structural feature into a second graph convolutional neural network model, and outputting code vectors respectively corresponding to the plurality of second text blocks through the second graph convolutional neural network model;
        determining a degree of difference between the first graph structural feature and the second graph structural feature based on the code vectors corresponding to the plurality of first text blocks and the code vectors corresponding to the plurality of second text blocks; and
        in response to determining that the degree of difference is less than a threshold, determining that the first graph structural feature and the second graph structural feature satisfy the condition; and
    in response to determining that the first graph structural feature and the second graph structural feature satisfy the condition, outputting the to-be-processed image as a search result of the image search.

16. The non-transitory computer-readable storage medium of claim 15, wherein the generating a first graph structural feature based on the plurality of first text blocks comprises:
    generating, based on a plurality of pieces of text content contained in the plurality of first text blocks, a plurality of semantic vectors respectively corresponding to the plurality of first text blocks;
    generating, based on relative position relationships among the plurality of first text blocks, a plurality of position relationship vectors among the plurality of first text blocks; and
    generating the first graph structural feature to comprise a plurality of groups of first feature vectors, wherein each of the groups of first feature vectors comprises a semantic vector corresponding to a first text block i, a semantic vector corresponding to a first text block j, and a position relationship vector between the first text block i and the first text block j, wherein the first text block i is one of the plurality of first text blocks, and the first text block j is one of the plurality of first text blocks other than the first text block i.

17. The non-transitory computer-readable storage medium of claim 15, wherein the determining the degree of difference between the first graph structural feature and the second graph structural feature based on the code vectors corresponding to the plurality of first text blocks and the code vectors corresponding to the plurality of second text blocks comprises:
    determining a first average value of the code vectors corresponding to the plurality of first text blocks and a second average value of the code vectors corresponding to the plurality of second text blocks; and
    determining, based on the first average value and the second average value, the degree of difference between the first graph structural feature and the second graph structural feature.

* * * * *